United States Patent [19]

Friesen

[11] Patent Number: 4,498,278
[45] Date of Patent: Feb. 12, 1985

[54] HARVESTER SWATH PICK-UP DRIVE

[76] Inventor: David Friesen, Box 6, R.R. #3, Winkler, Manitoba, Canada, R0G 2X0

[21] Appl. No.: 486,500

[22] Filed: Apr. 19, 1983

[30] Foreign Application Priority Data

Apr. 21, 1982 [AU] Australia .............................. 3685/82

[51] Int. Cl.³ .............................................. A01D 89/00
[52] U.S. Cl. ........................................ 56/364; 56/12.5; 56/11.9; 56/DIG. 21
[58] Field of Search .................... 56/11.9, 12.5, 364, 56/372, 373; 74/417, 606 R

[56] References Cited

U.S. PATENT DOCUMENTS

| 2,589,822 | 3/1952 | Kostka | 74/417 |
| 3,751,888 | 8/1973 | James | 56/364 |
| 3,983,683 | 10/1976 | James | 56/364 |
| 4,111,066 | 9/1978 | Kendrick | 74/417 |
| 4,120,137 | 10/1978 | Schoenberger et al. | 56/364 |
| 4,129,978 | 12/1978 | Friesen | 56/364 |
| 4,191,063 | 4/1980 | Borgersen | 74/417 |

Primary Examiner—Gene Mancene
Assistant Examiner—John G. Weiss
Attorney, Agent, or Firm—Stanley G. Ade

[57] ABSTRACT

A swath pick-up for a harvester provides a drive for the transverse toothed members which acts to rotate the toothed members about a transverse axis while moving them longitudinally of the axis. The drive comprises a pair of plates arranged at opposed ends of the transverse member each supporting a plurality of pairs of bevel gears mounted such that one bevel gear rotates with the plate while the other is rotated by rotation of the first to rotate the respective transverse member on a crank. The bevel gears are inter-connected either by a shaft or by an elbow casing. The first bevel gear is either fixed to the plate for rotation therewith or is rotated by an internal cam track provided on a cam plate parallel to the rotatable support plate.

14 Claims, 5 Drawing Figures

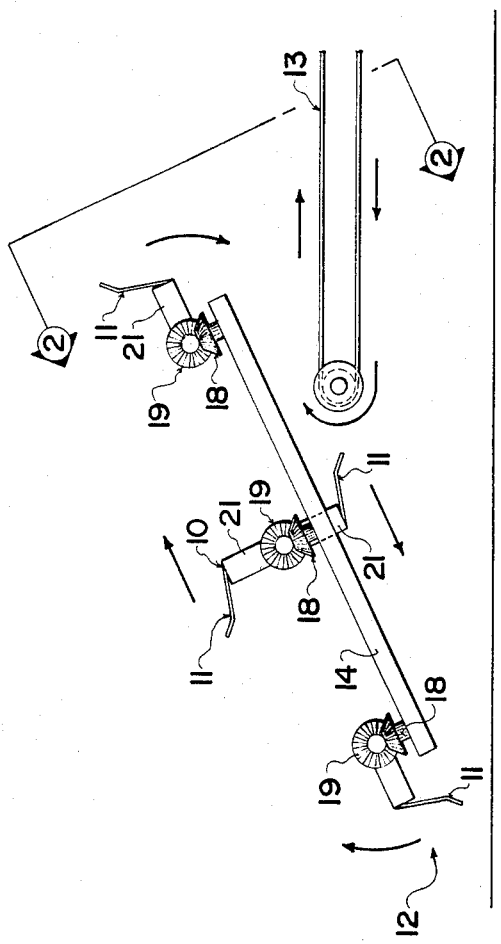
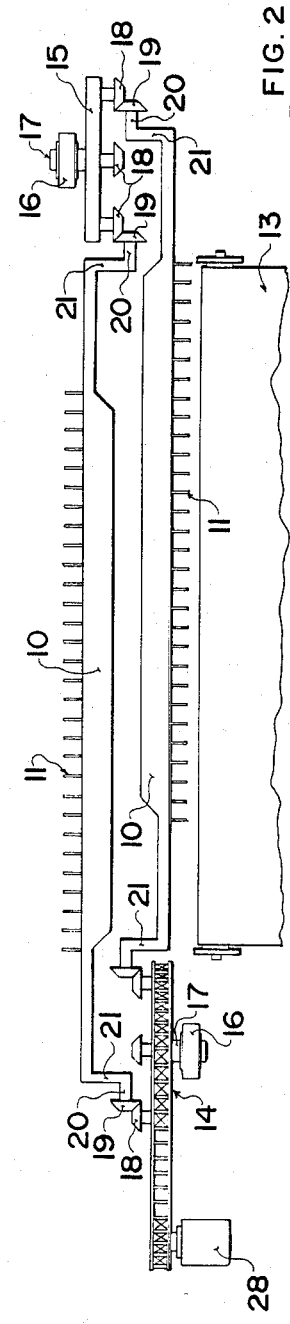
FIG. 1
FIG. 2

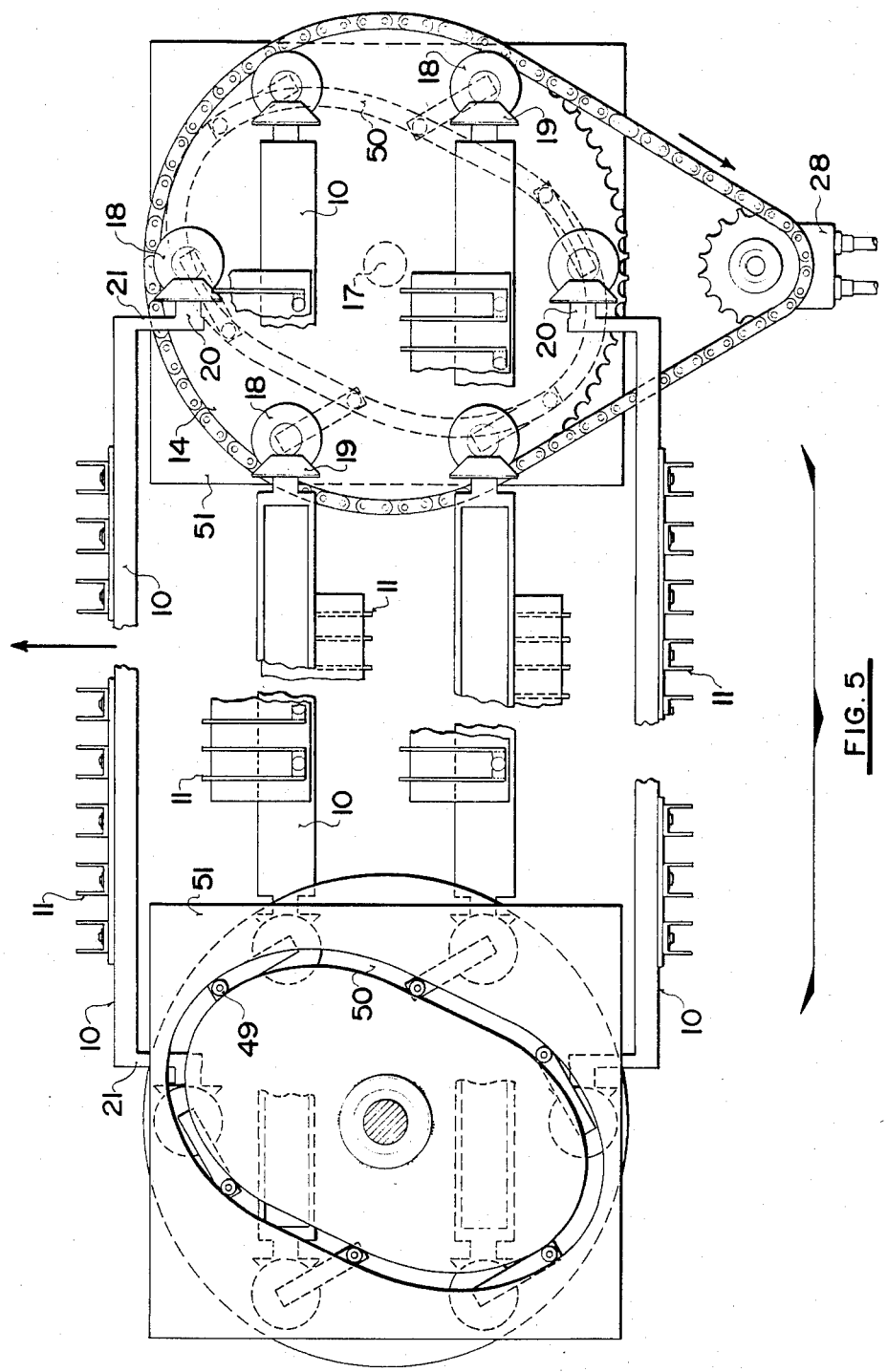

HARVESTER SWATH PICK-UP DRIVE

BACKGROUND OF THE INVENTION

This invention relates to new and useful improvements in drives for harvester swath pick-ups and consitutes an improvement in the arrangement disclosed in my U.S. Pat. No. 4,129,978 (Canadian Pat. No. 1,091,452 issued Dec. 16th, 1980).

In this patent, a swath pick-up includes a pair of spiders or support plates, one on each end of a frame and each being arranged at an angle with respect to the direction of travel and to the transverse axis of the pick-up. A forked inwardly offset arm is pivotally secured to a block on the outer end of each arm of each of the spiders, in the form of a universal joint. A transversely extending member, from which pick-up teeth extend, extends between each offset arm on one of the spiders and the corresponding arm on the other spider.

One of the spiders is rotated by a source of power such as a hydraulic motor and the angular relationship of the spiders causes the transverse members and the pick-up teeth to reciprocate transversely as they rotate. The offset arms enable a pick-up of reduced diameter to be provided thereby increasing the efficiency of the pick-up action yet providing sufficient room at the spiders for the installation and operation of the universal joints and arms on the spiders.

This invention has worked well and has seen some success but has disadvantages in that the drive tends to vibrate in view of the universal joint coupling between the spiders and the transverse members and the nature of universal joints running at a sharp angle.

SUMMARY OF THE INVENTION

It is one object of the invention therefore to provide a harvester swath pick-up of this type wherein the drive between the spiders and the transverse members is improved in order to provide a smooth and effective motion of the transverse members in the complex motion required.

Accordingly the invention provides a swath pick-up for attachment to a harvester comprising a plurality of members extending transversely across the pick-up arranged generally around and parallel to an axis transverse to the pick-up, each member supporting a plurality of teeth extending therefrom generally outwardly relative to the transverse axis and means for moving the members in a composite movement around the transverse axis and parallel to the transverse axis such that each tooth describes a closed path around the transverse axis, and inclined thereto, said moving means comprising a pair of parallel planar support members arranged at respective ends of the transverse members, means mounting the support members for rotation about parallel axes generally transverse thereto, each support member having mounted thereon a plurality of pairs of meshing gears at angularly spaced positions around the support member axis, means connecting one of each pair of gears to a respective one of the transverse members and means mounting the other of each pair of gears such that rotation of the support member about the axis of the support member causes rotation of the other gear about the axis of the other gear whereby to rotate said one gear and the attached transverse member.

It is one advantage of the invention that the spiders or support members can be in the form of plates which lie transverse to the pick-up in either a horizontal plane or in a plane slightly inclined thereto with the drive communicated from the plate to the transverse members by a pair of bevel gears arranged generally at right angles and supported by an outside casing.

It is a further advantage of the invention that the outside casing supporting the bevel gears can provide an enclosed drive which avoids problems of dust and other material entering the drive gears.

It is a yet further advantage of the invention that the drive is of a simple nature and yet provides a smooth and effective communication of the motion to the transverse members thus preventing vibration and consequent wear of the parts.

With the foregoing in view, and other advantages as will become apparent to those skilled in the art to which this invention relates as this specification proceeds, the invention is herein described by reference to the accompanying drawings forming a part hereof, which includes a description of the best mode known to the applicant and of the preferred typical embodiment of the principles of the present invention, in which:

DESCRIPTION OF THE DRAWINGS

FIG. 1 is a schematic side elevation of a swath pick-up for a harvester with the framework and mounting arrangements omitted for the sake of simplicity.

FIG. 2 is a rear elevational view along the lines 2—2 of the pick-up of FIG. 1.

FIG. 5 is a schematic plan view of the pick-up as shown in FIGS. 1 and 2.

In the drawings like characters of reference indicate corresponding parts in the different figures.

DETAILED DESCRIPTION

Figure 3:
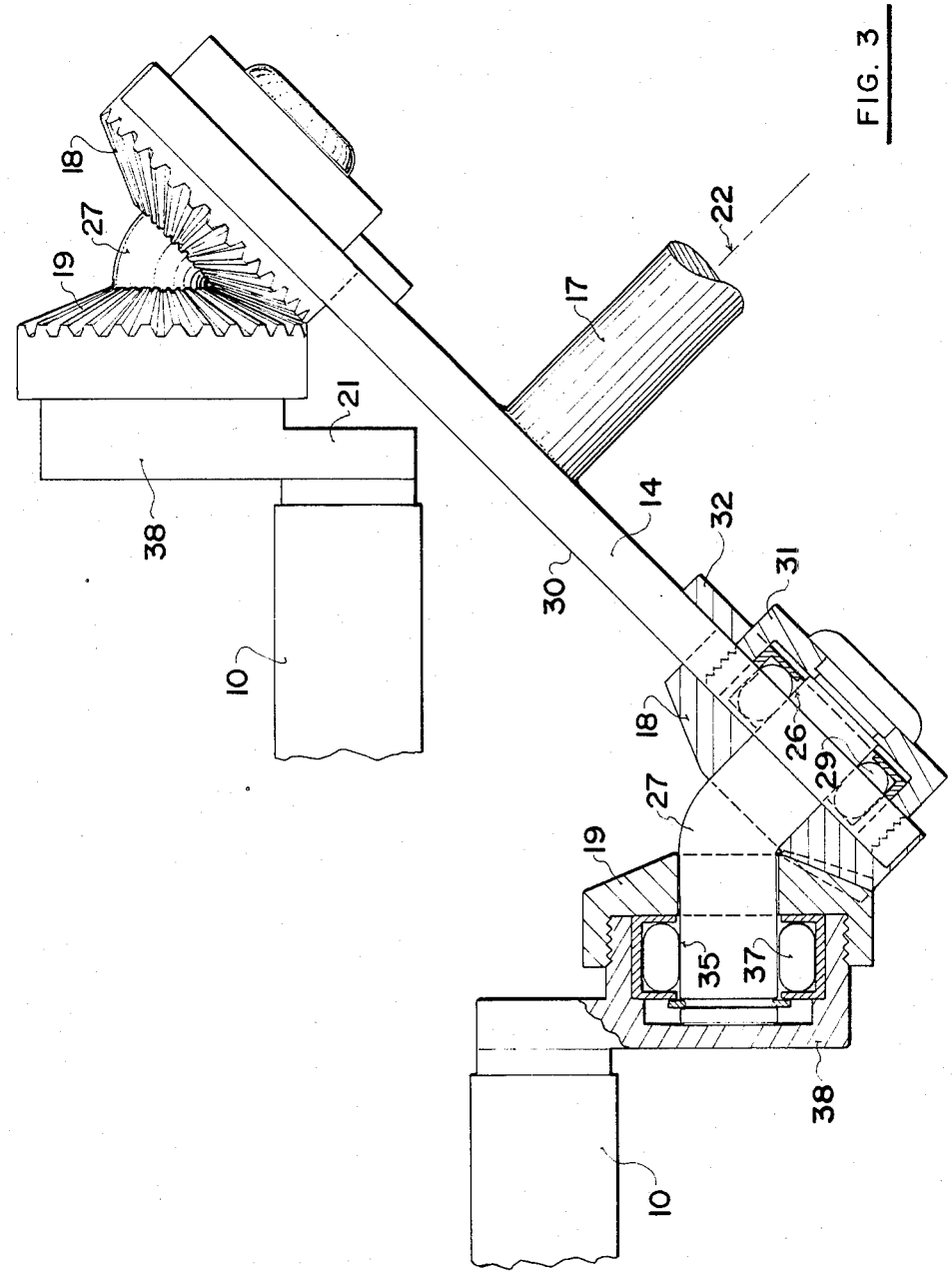
FIG. 3 is a more detailed view of one support member and associated bevel gears of a slightly modified embodiment where the support plate 14 is inclined toward the transverse members 10.

Reference is firstly made to my prior published U.S. Pat. No. 4,129,978 (Canadian Pat. No. 1,091,452) which discloses the frame structure and mounting arrangement of a swath pick-up device of this type but employing a different drive system for moving the transverse members carrying the teeth in the composite movement. It will be understood that the present invention includes a mounting arrangement and framework substantially as disclosed in the above patent and for this reason these features in relation to the present invention are omitted from the drawings and description following.

Referring therefore to FIGS. 1, 2, 5 and 6 there is shown schematically a drive arrangement for a swath pick-up of the above type. As shown in FIG. 5 there are six transverse members 10 supporting teeth 11 of the type shown in the above patent but for convenience of illustration some of the transverse members 10 and the corresponding drive arrangement are omitted from FIGS. 1 and 2.

Referring therefore firstly to FIGS. 1 and 2, a plurality of transverse members 10 are arranged transverse to the pick-up and extend from one side to the other side with the pick-up area lying between the drive arrangement on either side for pick-up of the swath at a nose area generally indicated at 12 for transport to a conveyor 13 which is conventional in the art. Each of the transverse members 10 in turn moves from the nose backwardly toward the conveyor 13 around an axis transverse to the pick-up with the teeth 11 thereof extending generally outwardly relative to the axis to carry the swath back to the conveyor 13. At the same time the transverse member moves sidewardly across the pick-up so that each tooth moves in a plane which is generally vertical and lying at an angle to the axis so as to assist in picking up straw which lies at right angles to the axis. It will be appreciated that the teeth move across the straw rather than parallel to the straw thus assisting in the pick-up.

This composite movement is provided by a drive arrangement comprising a pair of plates or discs 14, 15 mounted on shafts 17 supported on bearings 16 for rotation about parallel axes. As shown the axes of the plates 14, 15 lie in a substantially vertical forward plane and are inclined forwardly of the pick-up by an angle of the order of 30°. It will be appreciated that the plane of the plates in this embodiment is different from the plane of movement of the teeth but it is possible for the plates to lie substantially in any plane provided they are parallel, with the angle between the gears accommodating any variations in angle.

Each of the plates 14, 15 supports around its periphery a plurality of bevel gears 18 mounted on shafts secured to the plate 14, 15. The bevel gears 18 are in meshing relationship with co-operating bevel gears 19 arranged at right angles to the gears 18 so as to be driven thereby. The gears 19 are coupled to respective shafts 20 to which the transverse members 11 are secured by a crank arm 21.

Turning now to FIG. 3, the constructional details of the plate 14 with bevel gears 18 and 19 of one embodiment is shown. Only two bevel gear connections are shown for simplicity of illustration. In addition the embodiment is modified from that shown in FIGS. 1 and 2 in that the plate 14 is inclined such that its axis lies in a horizontal plane with the plate lying parallel to the direction of motion of the teeth. The axis of the plate 14 mounted on the shaft 17 is indicated at 22. The plate 14 is apertured equidistantly adjacent the periphery thereof and receives one end 26 of an angulated spindle 27 with one bevel or mitre gear 18 being journalled for rotation relative to the spindle by means of a bearing 29. The bevel gear 18 is mounted on the upper or outer face 30 of the plate 14. The spindle 27 and the gear 28 together with the bearing 29 are engaged and held by a nut 31 or the like screw threadably engaging an aperture in the plate 14 and an apertured flange 32 engages over the inner end 26 of the shaft 27 to assist in holding the assembly in position.

The other end 35 of the angulated shaft 27 carries the corresponding bevel or mitre gear 19 meshing with the gear 18 at an angle of approximately 135° and this bevel gear 19 is in turn supported upon a bearing 37 secured and mounted within the distal end 38 of the aforementioned offset crank 21 of the transverse member 10. Thus the bevel gear 18 is fixed to the plate 14 so that rotation of the plate 14 about its axis causes the bevel gear 18 to rotate about its own axis while the shaft 27 is free to rotate relative to the bevel gear 18.

It will be noted that the opposite end of the transverse member 10 is mounted upon a similar arrangement of bevel gears 18, 19 carried on the plate 15. However, the plate 15 is inverted relative to the plate 14. Also it will be noted that the member 10 adjacent the outer most edge of the plate 14 is coupled to the plate 15 adjacent the inner most edge and vice versa.

Rotation of the plate 14 through a motor and chain drive (schematically illustrated at 28) causes the bevel gears 18 to rotate with the plate around the axis of the plate thus transporting the transverse members 10 in a similar motion. At the same time the movement of the bevel gears 18 relative to the axis of the plate 14 causes the bevel gears 19 to rotate thus turning the cranks 21 and causing the transverse members 10 to rotate about the axis of the shaft 20 of the bevel gear 19. The bevel gears 18, 19 have a corresponding number of teeth such that as the plate 14 rotates through, for example 180°, the corresponding transverse member 10 similarly rotates through 180° relative to the shaft 20. These two extreme positions are illustrated in FIG. 2 with intermediate 90° positions also illustrated in FIG. 1. FIG. 5 shows the arrangement with six such transverse members in one location of the plate 14.

The cranks 21 provide an offset of the transverse member 10 relative to the shaft 20 which is sufficient to allow the transverse member 10 at the outer most edge of the disk to pass over the bevel gears and mounting of that at the inner most edge of the disk.

It will be appreciated that the position of the shaft 27 is constrained by the fact that the corresponding transverse member 10 is coupled to the other disk 15 thus retaining the transverse members 10 in parallel relationship lying across the pick-up. Also the transverse members 10 communicate rotation of the plate 14 to the plate 15 so they remain in synchronism.

Figure 4:
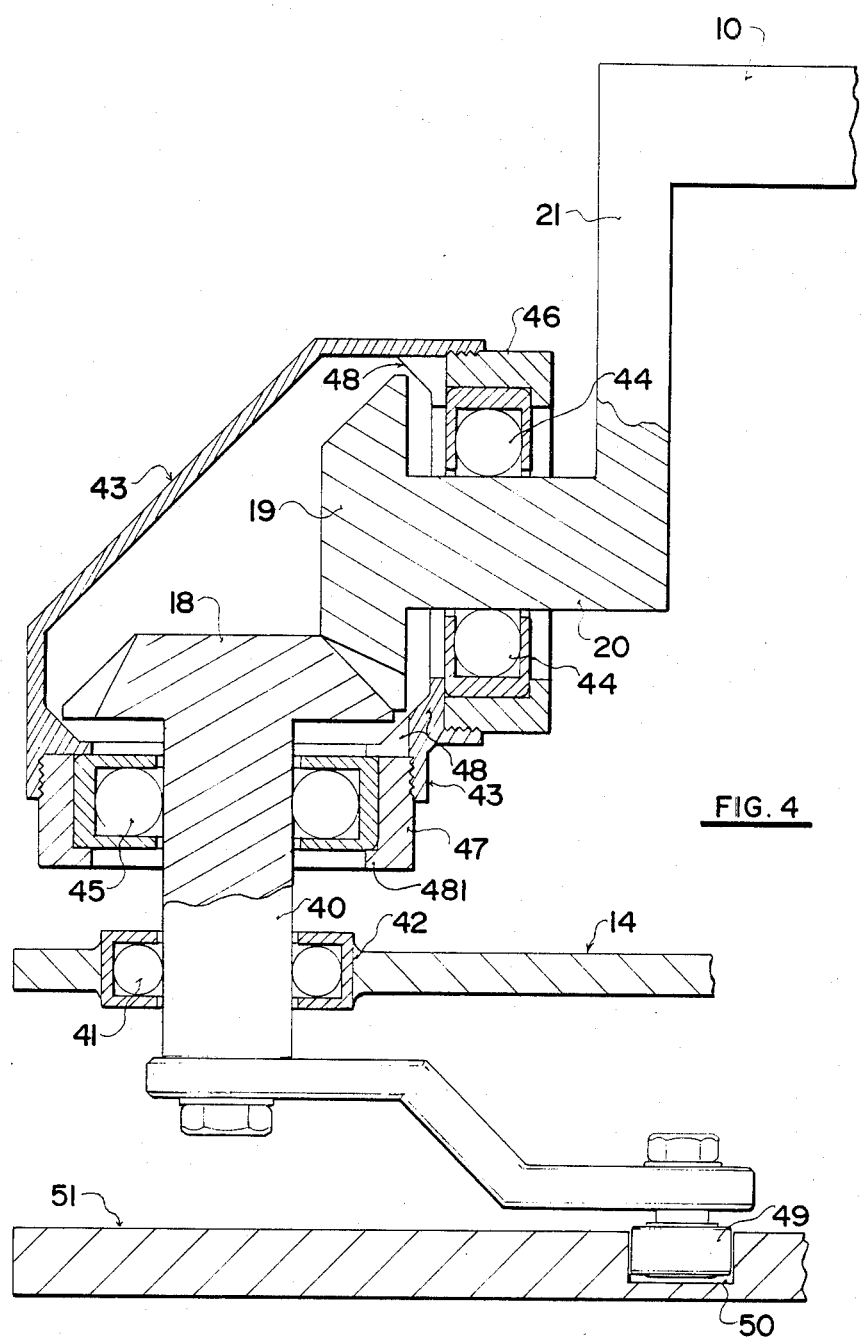
FIG. 4 is a more detailed view of a further embodiment showing the mounting arrangement for the bevel gears of FIGS. 1 and 2.

Turning now to FIG. 4 there is shown an alternative arrangement of mounting for the bevel gears 18, 19 on the plate 14. In this embodiment the plate lies in an orientation as shown in FIGS. 1 and 2 as opposed to the slightly angled orientation shown in FIG. 3.

In this embodiment the bevel gear 18 is rigidly attached to a shaft 40 mounted in bearings 41 carried in an aperture 42 of the plate 14. Thus the bevel gear 18 is free to rotate relative to the plate 14. The shafts 40 and 20 are mounted at rights angled relationship by a mounting member 43 which comprises a hollow casing or elbow surrounding the bevel gears 18, 19 and coupled to the shafts 20, 40 by bearing blocks 44, 45 respectively. The bearing blocks 44, 45 are attached to the shafts 20, 40 and also mounted in the elbow 43 by screw threaded collars 46, 47 co-operating with shoulders 48 provided on the elbow 43.

Thus the elbow 43 is free to rotate relative to the plate 14. As explained in relation to the previous embodiment, the transverse member 10 is retained transverse to the pick-up by the co-operation of the plate 14 and the plate 15 and thus the elbow 43 similarly remains parallel to the axis of the pick-up. This orientation is maintained regardless of the rotation of the plate 14 with the rotation being provided by the bearings 45.

Rotation of the bevel gear 18 around its axis is provided by a cam follower 49 mountd on the end of the shaft 40 remote from the bevel gear 18 which co-operates with a cam track 50 provided in the cam plate 51 parallel to the plate 14. The track 50 provides a generally closed track around the plate 51 so that it will be appreciated that effectively a 360° rotation of the plate 14 causes a 360° rotation of the bevel gear 18 about its axis. Such rotation of the bevel gear 18 is communicated through bevel gear 19 to the transverse member 10 as explained previously.

In this embodiment however the cam track 50 is arranged such that the rotation of the transverse members 10 about the respective shaft 20 is controlled in a non-constant manner so that the teeth follow the path schematically illustrated in FIG. 6. Specifically the rotation is modified so that the the rotation of the teeth 11 is very much delayed adjacent the front roller of the conveyor 13 so that the front roller can be arranged as close as possible to the underside of the pick-up. After the conveyor 13 and before the nose area 12 the rate of rotation is increased and then maintained constant around the nose area across the top part indicated generally at 52 the motion is again delayed so that the teeth remain at a substantially constant angle relative to the plate 14. Immediately after the front roller of the conveyor 13 the transverse member 10 is rapidly rotated to assume the position indicated along the underside of the pick-up. The necessary shaping of the cam track 51 will be apparent to one skilled in the art and therefore is not shown in detail.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

I claim:

1. A pick-up attachment for a harvester comprising a plurality of members extending transversely across the pick-up arranged generally around and parallel to an axis transverse to a direction of movement of the pick-up, each member supporting a plurality of tines extending therefrom generally outwardly relative to the transverse axis and means for moving the members in a composite movement around the transverse axis and parallel to the transverse axis such that each tine describes a closed path around the transverse axis and inclined thereto, said moving means comprising a pair of parallel planar support members arranged at respective ends of the transverse members, means mounting the support members for rotation about parallel axes generally transverse thereto and lying in a substantially vertical plane, each support member having mounted thereon a plurality of pairs of meshing gears at angularly spaced positions around the support member axis for rotation therewith, offset crank means connecting one of each pair of gears to a respective end of a respective one of the transvers members and means mounting the other of each pair of gears such that rotation of the support member about the axis of the support member causes rotation of said offset crank means about an axis substantially at right angles to said support member axis, said offset crank means of each transverse member being arranged to offset the transverse member outwardly relative to the other transverse members, whereby said rotation of said support members moves the transverse members substantially in a planar movement parallel to the support member plane and not parallel to said composite movement and the rotation of said crank means adds to said planar movement to form said composite movements.

2. An assembly according to claim 1 wherein each pair of gears comprises a pair of meshing bevel gears mounted on respective shafts arranged substantially at right angles relative to one another.

3. An assembly according to claim 2 wherein the bevel gear shafts are mounted on bearings and wherein there is provided bearing support menas for supporting the shafts at a constant angle to one another.

4. An assembly according to claim 3 wherein the bearing support means is rotatable relative to the support member.

5. An assembly according to claim 3 wherein the bearing support means comprises a casing surrounding the bearings and shafts of the bevel gears with means mounting the bearings in the casing.

6. An assembly according to claim 5 wherein the casing includes screw threaded portions at respective ends thereof for co-operation with screw threaded members, whereby the bearings are mounted on the casing by the co-operation between the screw threaded members and the screw threaded portions.

7. An assembly according to claim 1 including a cam lying in a plane parallel to the support member and wherein each other gear includes a cam follower for co-operating with the cam such that rotation of the support member causes rotation of the other gear about its axis.

8. An assembly according to claim 1 wherein the support member comprises a plate with the other gears mounted in openings provided in the plate spaced around the axis of rotation of the plate.

9. An assembly according to claim 1 wherein the pairs of gears have the same number of teeth so that one rotation of the support member provides one rotation of the transverse member.

10. An assembly according to claim 1 including drive means for driving one of the support members.

11. An assembly according to claim 1, wherein one support member is inverted relative to the other.

12. An assembly according to claim 1 wherein the support members are inclined whereby said planar movement is inclined upwardly and rearwardly relative to said direction of movement.

13. A pick-up attachment for a harvester comprising a plurality of members extending transversely across the pick-up arranged gnerally around and parallel to an axis transverse to a direction of movement of the pick-up, each member supporting a plurality of tines extending therefrom generally outwardly relative to the transverse axis and means for moving the members in a closed path having a composite movement around the transverse axis and parallel to the transverse axis, said moving means comprising a pair of support members arranged at respective ends of the transverse members and lying in parallel planes which are not parallel to the movement of the tines, means mounting the support members for rotation about parallel axes generally transverse thereto and lying in a substantially vertical plane, each support member having a plurality of connecting means mounted thereon at angularly spaced positions around the support member axis for rotation therewith, a plurality of offset crank means each interconnecting a respective one of the connecting means to a respective end of a transverse member, said connecting means being arranged to rotate said crank means around said support member axis and about an axis at right angles to said support member axis, said offset crank means of each transverse member being arranged to offset the transverse member outwardly relative to the other transverse members, whereby said rotation of said support members moves the transverse members substantially in a planar movement parallel to the support member plane and rotation of said crank means adds to said planar movement to form said composite movement.

14. A pick-up attachment for a harvester comprising a plurality of members extending transversely across the pick-up arranged generally around and parallel to an axis transverse to a direction of movement of the pick-up, each member supporting a plurality of tines extending therefrom generally outwardly relative to the transverse axis and means for moving the members in a closed path having a composite movement around the transverse axis and parallel to the transverse axis, said moving means comprising a pair of support members arranged at respective ends of the transverse members, and lying in parallel planes which are not parallel to the movement of the tines, means mounting the support members for rotation about parallel axes generally transverse thereto, each support member having a plurality of connecting means mounted thereon at angularly spaced positions around the support member axis for rotation therewith, a plurality of offset crank means each interconnecting a respective one of the connecting means to a respective end of a transverse member, said connecting means being arranged to rotate said crank means around said support member axis and about an axis at an angle to said support member axis, said offset crank means of each transverse member being arranged to offset the transverse member outwardly relative to the other transverse members.

* * * * *